(12) United States Patent
Meudal

(10) Patent No.: US 11,905,193 B2
(45) Date of Patent: Feb. 20, 2024

(54) LIQUID EFFLUENT TREATMENT MODULE

(71) Applicant: Nicolas Meudal, Lucerne (CH)

(72) Inventor: Nicolas Meudal, Lucerne (CH)

( * ) Notice: Subject to any disclaimer, the term of this patent is extended or adjusted under 35 U.S.C. 154(b) by 264 days.

(21) Appl. No.: 17/285,852

(22) PCT Filed: Oct. 17, 2019

(86) PCT No.: PCT/EP2019/078242
§ 371 (c)(1),
(2) Date: Apr. 15, 2021

(87) PCT Pub. No.: WO2020/083743
PCT Pub. Date: Apr. 30, 2020

(65) Prior Publication Data
US 2021/0371310 A1 Dec. 2, 2021

(30) Foreign Application Priority Data

Oct. 22, 2018 (FR) .................................. 1871266

(51) Int. Cl.
*C02F 3/08* (2023.01)
*C02F 3/10* (2023.01)
*B01F 23/231* (2022.01)
*B01F 25/50* (2022.01)

(52) U.S. Cl.
CPC ............ *C02F 3/08* (2013.01); *B01F 23/2311* (2022.01); *B01F 25/50* (2022.01); *C02F 3/10* (2013.01); *B01F 23/23113* (2022.01); *C02F 2203/006* (2013.01); *C02F 2301/026* (2013.01)

(58) Field of Classification Search
CPC ........ C02F 3/08; C02F 3/10; C02F 2203/006; C02F 2301/026; B01F 23/2311; B01F 25/50; B01F 23/23113; B01F 35/53; Y02W 10/10

USPC .......................................................... 210/603
See application file for complete search history.

(56) References Cited

U.S. PATENT DOCUMENTS

| 3,984,322 | A | 10/1976 | Peasley et al. |
| 4,139,457 | A | 2/1979 | Mackrle et al. |
| 7,431,833 | B1 * | 10/2008 | Emmerich .............. B01F 33/81 210/220 |

(Continued)

FOREIGN PATENT DOCUMENTS

| WO | WO-03099425 A1 * | 12/2003 | ................ C02F 3/12 |
| WO | 2020083743 A1 | 4/2020 | |

OTHER PUBLICATIONS

Translation of WO03099425A1_Pacaud_NPL.pdf (Year: 2003).*

(Continued)

*Primary Examiner* — Ekandra S. Miller-Cruz

(57) ABSTRACT

Liquid effluent treatment module comprising at least one tank portion suitable for receiving a plurality of packing elements that may receive a biological material, the tank portion defining a horizontal longitudinal axis and comprising at least one effluent feed, characterized in that the tank portion further comprises: ○at least one line for collecting treated effluent arranged in a central part of the tank portion and parallel to the horizontal longitudinal axis, ○at least one air injection line arranged in a lower part of the tank portion, off-centered and parallel to the line for collecting treated effluent so as to give rise to a spiral movement of the liquid effluents.

13 Claims, 3 Drawing Sheets

(56) References Cited

Figure 1:
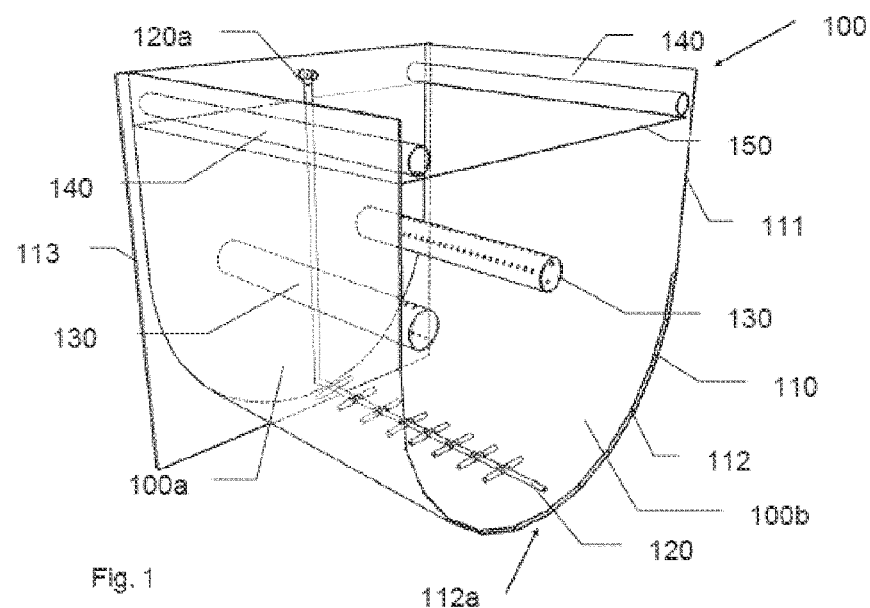

U.S. PATENT DOCUMENTS 10,040,711 B2 * 8/2018 Graveleau ............... C02F 3/085
2016/0107912 A1 * 4/2016 Novak ................... C12M 23/40
210/603

OTHER PUBLICATIONS

Foreign Communication from a Related Counterpart Application, International Search Report dated Jan. 22, 2020, International Application No. PCT/EP2019/078242 filed on Oct. 17, 2019.
Foreign Communication from a Related Counterpart Application, Written Opinion dated Jan. 22, 2020, International Application No. PCT/EP2019/078242 filed on Oct. 17, 2019.
Foreign Communication from a Related Counterpart Application, French Search Report and Written Opinion dated Jul. 16, 2019, French Application No. 1871266 filed on Oct. 22, 2018.

* cited by examiner

LIQUID EFFLUENT TREATMENT MODULE

CROSS-REFERENCE TO RELATED APPLICATIONS

The present application is a filing under 35 U.S.C. 371 as the National Stage of International Application No. PCT/EP2019/078242, filed Oct. 17, 2019, entitled "LIQUID EFFLUENT TREATMENT MODULE," which claims priority to French Application No. 1871266 filed with the Intellectual Property Office of France on Oct. 22, 2018, both of which are incorporated herein by reference in their entirety for all purposes.

The present invention generally concerns a treatment module for liquid effluents, particularly industrial or domestic liquid effluents as discharged from a bathroom or a kitchen.

Thus, the treatment of the liquid effluents or wastewater resulting from human activities has become for several decades a matter of concern for the authorities and the citizens. Many standards and regulations now prevent the release of these effluents into the environment without any treatment.

It is known in the prior art liquid effluent treatment devices in which packing elements provided with a biological material are kept in suspension in the liquid effluents, so as to remove polluting compounds. For example, document U.S. Pat. No. 7,431,833 describes a heart-shaped tank, comprising two half-tanks, in which the effluent supply is carried out in a half-tank and the collection of the effluents is carried out in the other half-tank.

On the other hand, this device has in particular the drawback of requiring a tank of complex shape, of large width and particularly of high height, so as to allow good circulation of the liquid effluents within each half-tank as well as from one half-tank to another and/or requires a high air injection flow rate synonymous with high operating cost. In addition, such a tank is difficult to manufacture and may show weaknesses, due to its specific shape. This device is therefore expensive and is not adapted to a transportable effluent treatment device, i.e. which can be transported in an assembled form in a sea container or a truck.

An aim of the present invention is to respond to the drawbacks of the document of the prior art mentioned above and particularly, first of all, to propose a liquid effluent treatment device which is effective and simple to manufacture, so as to have a reduced manufacturing and operating cost. An additional aim of the present invention is to propose an effluent treatment device of reduced width and especially reduced height, so as to allow its transportation in an assembled form, in order to greatly reduce the transportation costs and to allow temporary installation, for example during one-time events.

For that purpose, a first aspect of the invention concerns a liquid effluent treatment module comprising at least one tank portion adapted to accommodate a plurality of packing elements in suspension capable of accommodating a biological material, the tank portion defining a horizontal longitudinal axis and comprising at least one effluent supply, the tank portion further comprising:
- at least one treated effluent collection ramp arranged in a central part of the tank portion and parallel to the horizontal longitudinal axis,
- at least one air injection ramp arranged in a lower part of the tank portion, eccentrically and parallel to the treated effluent collection ramp, so as to cause a spiral movement of the liquid effluents.

Such an arrangement, particularly of the treated effluent collection ramp and of the air injection ramp, allows creating and maintaining a spiral movement of the liquid effluents resulting in an effective treatment of the effluents, in a tank of minimum width and height and for a minimum energy cost, particularly thanks to a reduced air injection flow rate. In addition, such a tank does not require a complex shape which is expensive to manufacture and fragile during transportation. The spiral movement occurs in eccentric areas of the tank portion towards the central part of the tank i.e. towards and around the treated effluent collection ramp.

The tank portion is adapted to accommodate packing elements in suspension in the liquid effluents, whether enclosed in a cage located in the tank or preferably freely with the liquid effluents. Preferably, the tank portion includes no relief, wall or internal element capable of opposing the movement and in particular the rotation of the packing elements. This contributes to an effective treatment of the liquid effluents by the biological material provided on the packing elements.

Advantageously, the at least one effluent supply comprises at least one effluent supply ramp, which further allows strengthening the spiral movement of the effluents and therefore reducing the width and the height of the tank while limiting the energy consumption during operation.

Advantageously, the effluent supply ramp is arranged in a parallel and/or eccentric manner relative to the air injection ramp. Thus, the eccentric arrangement of the effluent supply ramp and of the air injection ramp relative to each other and to the treated effluent collection ramp allows an optimal spiral movement of the effluents.

Advantageously, the effluent supply ramp is arranged in an upper part of the tank portion, for example above the level of the effluents in the tank, which allows benefiting from the gravitational force and limiting the pumping power necessary to achieve the effluent supply. In this case, the effluent supply ramp can comprise supply ports oriented only downwards, so as to create a descending stream of effluents in the tank portion. Alternatively, the effluent supply ramp can be immersed in the tank. In addition, the supply ramp can be movable in rotation so as to orient the supply ports in an optimum direction relative to the spiral movement of the effluents.

Advantageously, the effluent supply ramp is arranged in an eccentric manner relative to the air injection ramp, so as to strengthen the spiral movement and thus limit the pressure and especially the air injection flow rate.

Especially advantageously, the effluent collection ramp and the effluent supply ramp are located from bottom to top on a diagonal plane of the tank portion, which allows an optimal spiral movement in a tank of low width and low height.

Advantageously, the treated effluent collection ramp is arranged halfway between the air injection ramp and the effluent supply ramp, so as to allow a spiral movement of the effluents as smooth and as optimized as possible.

Especially advantageously, the tank portion comprises a lower part of curved or beveled section, for example constituting the lower half or third of the tank. Such a section thus allows promoting the spiral movement of the liquid effluents in the tank portion and further limiting its height and its width and/or stiffening the tank. For example, the lower part comprises at least one and preferably only one or possibly two generatrices parallel to the horizontal longitudinal axis of the tank, i.e. the curved or beveled section and the treated effluent collection ramp are oriented along the same horizontal longitudinal axis of the tank.

Advantageously, the tank portion and particularly the lower part comprises a bottom and the air injection ramp is arranged on this bottom, for example fixed on this bottom or in the vicinity of this bottom. This arrangement is preferable to maximize the air bubble ascending stream created by the air injection ramp and therefore to strengthen the spiral movement of the effluents while limiting the pressure and the air injection flow rate.

Especially advantageously, the tank portion comprises a plurality of packing elements as well as liquid effluents and the air injection ramp and the treated effluent collection ramp are arranged to allow by themselves the spiral movement of the liquid effluents. This therefore avoids the need for a mechanical stirring and therefore limits the energy consumption of the treatment module according to the present invention. For example, the packing elements are provided with a biological material adapted to treat, i.e. purify, clean or depollute the liquid effluents introduced into the tank or the tank portion, for example by an aerobic biological process.

Advantageously, the tank is formed by two tank portions which can be separated by a vertical plane of symmetry. In addition, the at least one air injection ramp can be disposed in the vertical plane of symmetry, in order to optimize the effluent treatment flow rate. For example, a single air injection ramp is used for the two tank portions, which limits the manufacturing costs of the effluent treatment module according to the present invention. Alternatively, one or more air injection ramps can be disposed in each tank portion, for example in the case of viscous liquid effluents or requiring a high air injection flow rate. In addition, only one supply ramp can be used for both tank portions.

For example, the central part of a tank portion is arranged halfway between the plane of symmetry and a lateral partition of the tank and/or at mid-height of the tank.

Advantageously, the tank formed of two symmetrical tank portions comprises a lower part of curved or trapezoidal section. For example, the curved section has a single radius of curvature and the trapezoidal section has its smallest width downwards, i.e. serving as a bottom. This allows limiting the manufacturing costs of the present treatment module while allowing high effluent treatment efficiency.

For example, the tank or the tank portion comprises a sealed top cover so as to improve the efficiency of the treatment of the liquid effluents and/or a gas collection device so as to limit the gaseous emissions into the environment and/or upgrade these gaseous emissions.

Especially advantageously, the tank or the tank portion has a height of less than 3 m, for example from 1.5 m to 3 m and preferably from 2 m to 3 m. This allows the effluent treatment module to be transported and delivered fully assembled by road and/or sea, for example in a standard sea container. In addition, the width of the tank, transverse to its longitudinal axis, may be less than 3.05 m, for example from 1.5 m to 3 m, preferably from 2.3 m to 3 m. Such small dimensions are made possible by the specific arrangement of the present treatment module.

A second aspect of the invention is a liquid effluent treatment system including at least one treatment module according to the first aspect of the invention as well as motorized effluent supply and air injection devices. For example, it may be pumping means and air compression means. In addition, pumping means can assist the collection of the treated effluents.

A third aspect of the invention concerns a liquid effluent treatment method using a treatment module according to the first aspect of the invention or a treatment system according to the second aspect of the invention, said method comprising the steps consisting of:
- providing a plurality of packing elements accommodating a biological material in a tank or a tank portion,
- supplying the tank portion with liquid effluents to be treated by the effluent supply,
- injecting air through the air injection ramp so as to create a movement of the liquid effluents in the form of a spiral,
- collecting the treated effluents by the treated effluent collection ramp arranged at the center of the spiral movement and/or in a central part of the tank or of the tank portion.

Such a method allows an optimal spiral movement of the effluents in a tank of limited height and with an air injection pressure and especially a limited air flow rate. Preferably, the packing elements are adapted to be in suspension in the liquid effluents. For example, they comprise a density between 0.8 and 1.2 and preferably around 1.

Advantageously, the present method comprises a step consisting of reintroducing part of the effluents collected in the tank by the effluent supply ramp.

Preferably, no filter media of sand, gravel or stone type is present in the tank or tank portion so as not to impede the circulation of the packing elements and/or of the liquid effluents.

A fourth aspect of the invention is a liquid effluent treatment module comprising a tank portion adapted to accommodate a plurality of packing elements capable of accommodating a biological material, the tank portion comprising at least one effluent supply, in which the tank portion is adapted to allow a spiral movement of the liquid effluents and comprises to this end:
- at least one treated effluent collection ramp arranged to be located in a central part of the spiral movement,
- at least one air injection ramp arranged to be located in an external part of the spiral movement, for example in a lower part of the tank portion and/or of the spiral movement.

In addition, the effluent supply can be an effluent supply ramp arranged in an external part of the spiral movement, for example in an upper part of the tank portion. In addition, the effluent supply ramp can be arranged to create in the tank portion an effluent supply stream in the direction of the spiral movement, i.e. strengthening this movement.

A fifth aspect of the invention is a liquid effluent treatment module comprising a tank adapted to accommodate a plurality of packing elements capable of accommodating a biological material and having a longitudinal, for example horizontal, axis as well as a wall and a bottom, the tank comprising:
- a plane of symmetry defining at least two tank portions that are symmetrical to each other,
- at least one air injection ramp disposed on the bottom and on the plane of symmetry of the tank, for example a single air injection ramp,
- at least one treated effluent collection ramp arranged to be located in a central part of the tank portion,
- at least one effluent supply ramp arranged in the tank, for example in the vicinity of the wall of the tank and/or in an upper part of the tank.

Preferably, an effluent supply ramp is located in each tank portion.

Finally, the second, third, fourth and fifth aspects of the invention can comprise all the advantageous characteristics of the first aspect of the invention.

Figure 2:
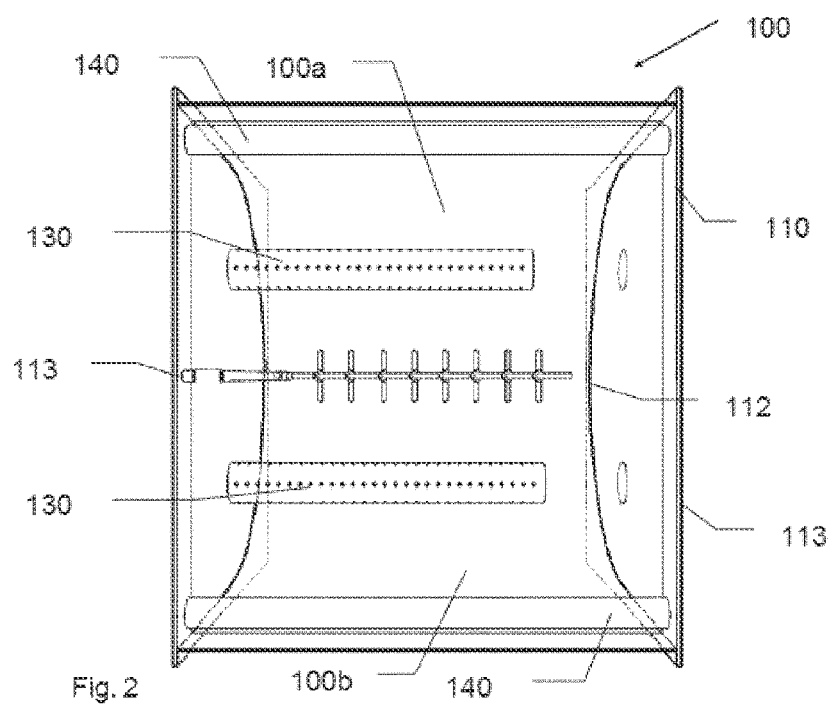
Figure 3:
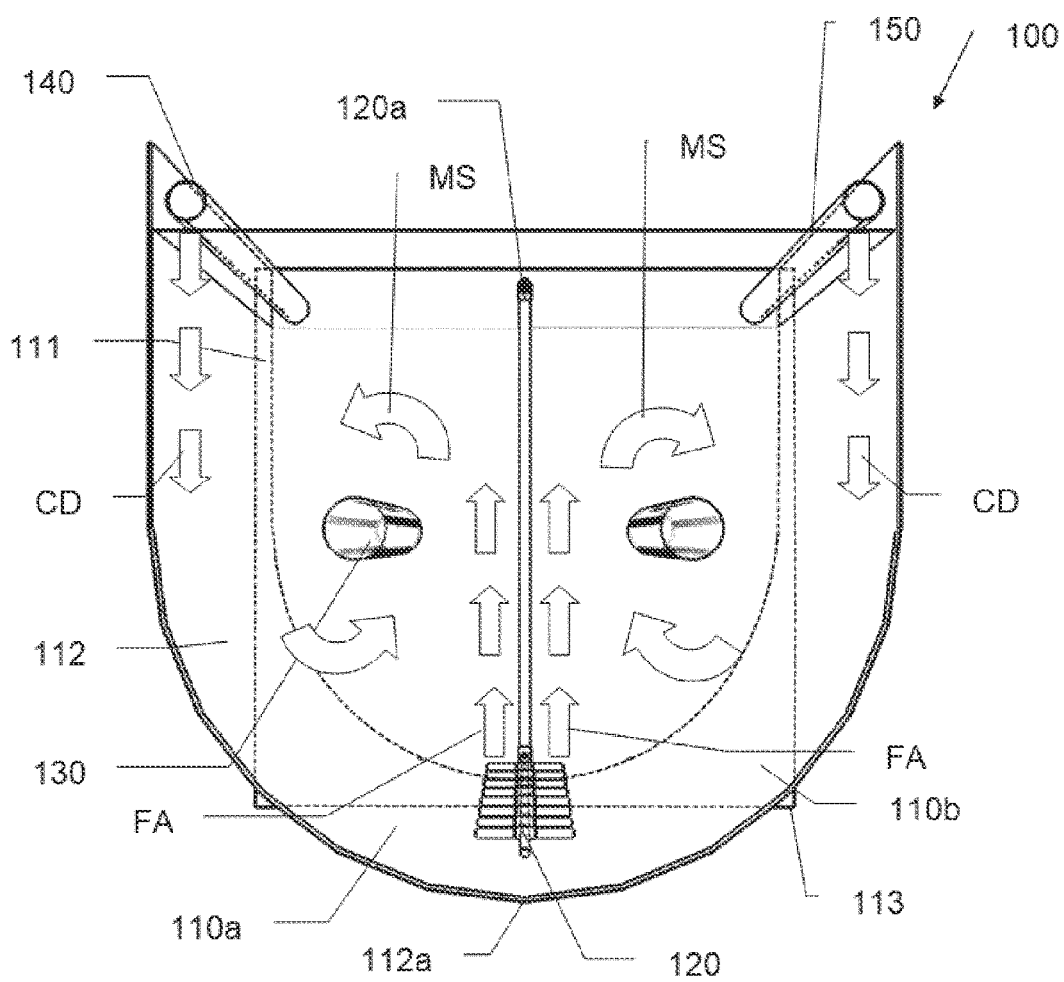
Figure 4:
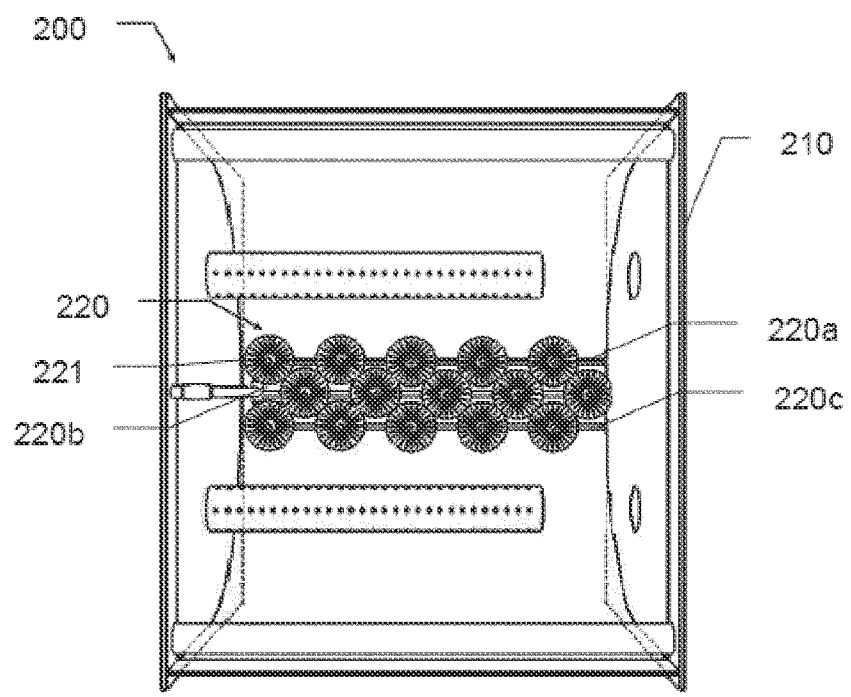

Other characteristics and advantages of the present invention will appear more clearly upon reading the following detailed description of one embodiment of the invention given by way of non-limiting example and illustrated by the appended drawings, in which:

FIG. 1 represents a three-quarter sectional view of an effluent treatment module according to the present invention, FIG. 2 represents a top view of the effluent treatment module according to FIG. 1, FIG. 3 represents a front sectional view of the effluent treatment module according to FIGS. 1 and 2, FIG. 4 represents another effluent treatment module according to the present invention.

The present invention concerns a liquid effluent treatment module for accommodating packing elements containing or supporting a biological material allowing treatment or depollution of the liquid effluents. Preferably, this liquid effluent treatment module is transportable by sea and/or road, i.e. its dimensions and particularly its height are sufficiently small for it to be placed in an assembled form in a standard container.

In addition, the liquid effluent treatment module according to the present invention can be connected with other liquid effluent service and/or treatment modules so as to constitute a liquid effluent treatment station. For example, these modules can be pumping, control and analysis modules or effluent storage modules or physical, chemical or biological treatment modules, as known to those skilled in the art.

FIGS. 1 to 3 represent a liquid effluent treatment module 100 according to a first embodiment. This treatment module 100 comprises a tank 110 intended to accommodate liquid effluents to be treated, for example domestic and industrial wastewater that cannot be released as they are into the environment. In addition, the tank 110 can be adapted to accommodate mobile packing elements in suspension, preferably so as to allow their free circulation and rotation in the tank without the presence of walls, internal elements or reliefs leading to prevent or limit the movement of these packing elements or of the liquid effluents. For example, the packing elements are made of plastic material, composite or organic material and can accommodate a biological material and in particular microorganisms making it possible to treat or clean up the liquid effluents contained in the tank 110.

The tank 110 is provided with a vertical central plane of symmetry (not represented) defining two half-tanks or tank portions 110a and 110b and on which an air supply pipe 120a lies, as detailed below. The tank 110 has a U-shaped section, comprising an upper part 111 delimited by substantially parallel and vertical walls and a lower part 112 of curved section, i.e. comprising one or possibly several radii of curvature. The lower part 112 defines a bottom 112a which is for example an area of the lower part 112 where the tank 110 has a greater height. For example, the curved wall of the lower part 112 may consist of flat and elongate elements disposed next to each other so as to define together a radius of curvature, as represented in FIG. 1.

The tank 110 comprises a horizontal longitudinal axis as well as two ends on either side of the U-shaped section, each closed by a vertical plate 113. Thus, each tank portion 110a and 110b comprises one half of the lower part 112, one half of the upper part 111 and two halves of vertical plates 113. Preferably, the walls of the tank are formed of a solid and sealed material, such as stainless steel, aluminum, a plastic material or a composite.

In addition, the tank 110 accommodates in its lower part 112 an air injection ramp 120 located for example on the vertical plane of symmetry and between the tank portions 110a and 110b. Thus, the air injection ramp 120 can be put or placed in the vicinity of the bottom 112a and can be surmounted by the largest column of liquid existing in the tank 110. This air injection ramp 120 is connected by the air supply pipe 120a to an air injection system comprising for example a compressor (not represented) and providing an air pressure greater than the pressure of the liquid column applying on the air injection ramp 120, so as to achieve an injection of air into the lower part 112 in the form of air bubbles, as known to those skilled in the art.

In addition, in FIGS. 1 to 3, the tank 110 comprises two treated effluent collection ramps 130 parallel to the longitudinal axis of the tank and preferably protruding from one of the vertical walls or plates 113 and located in a central part of each of the tank portions of 110a and 110b, for example at mid-height of the tank 110 and/or between the upper part 111 and the lower part 112. Thus, the treated effluent collection ramps are located in a horizontal plane between the top of the tank 110 and the bottom 112a or between the level of the effluents 150 contained in the tank 110 and the air injection ramp 120.

In addition, the treated effluent collection ramps 130 can each be located halfway between a vertical wall of the tank 110 and the vertical plane of symmetry. In other words, each treated effluent collection ramp 130 can occupy a central part of the volume of each tank portion 110a, 110b, for example on the horizontal longitudinal axis passing through the isobarycenter of each tank portion.

These treated effluent collection ramps 130 are intended to collect and discharge the treated liquid effluents and are hydraulically connected to another liquid effluent treatment element or to a treated liquid effluent discharge and/or storage device (not represented).

Finally, each tank portion 110a and 110b comprises an effluent supply ramp 140 extending from one of the vertical plates 113, in the upper part 111 of the tank 110, for example in a horizontal plane at the top of the tank 110, preferably above the level of effluents 150 in the tank 110. The effluent supply ramp is also eccentric relative to the air injection ramp 120 and is located in the vicinity of a wall of the tank 110, parallel to the longitudinal axis of the tank 110.

Thus, the air injection ramp 120, the treated effluent collection ramp 130 and the effluent supply ramp 140 can be located from bottom to top on a diagonal plane of each tank portion 110a, 110b. In addition, the treated effluent collection ramp 130 can be located halfway between the air injection ramp 120 and the effluent supply ramp 140 (see FIG. 3).

The effluent supply ramps 140 are connected, for example, to an effluent supply pump and/or to an effluent storage tank (not represented). These effluent supply ramps 140 are intended to supply, for example continuously, the tank 110 with liquid effluents to be treated, so as to maintain an approximately constant level of effluents 150 in the tank 110. Thus, the supply flow rate can be substantially equal to the effluent discharge flow rate.

The ramps used for the supply and discharge of the effluents are perforated and/or latticed cylindrical elements extending over a major part of the length of the tank 110, for example over a length greater than or equal to half or three-quarters of the length of the tank or over the entire length of the tank. For example, the supply ramps 140 of FIGS. 1-3 are perforated with ports oriented only downwards or at least located in the lower part of the supply ramps, which allows contributing to the spiral movement of the treated effluents.

In addition, the air injection ramp 120 can be fitted with perforated transverse tubes, in order to ensure a flow rate and an optimal distribution of the injected air. Alternatively, other elements known to those skilled in the art can be used, such as longitudinal latticed elements, in particular for the treated effluent collection ramps 130.

FIG. 3 represents a liquid effluent treatment tank 110 in operation. It is thus provided with the air injection ramp 120 put on the bottom 112*a* at its center or on a vertical plane of symmetry, of the vertical air supply pipe 120*a* located on the vertical plane of symmetry. It further comprises the two treated effluent collection ramps 130 in a median horizontal plane and the two effluent supply ramps 140 in the upper part 111 of the tank 110, for example at its top. Thus, in the embodiment of FIGS. 1-3, only one air injection ramp 120 is used for each of the tank portions 110*a* and 110*b*. Alternatively, one or more air injection ramps can be provided in each of the tank portions.

In addition, in each tank portion 110*a*, 110*b*, a treated effluent collection ramp 130 is located in a central part of the tank portion while the air injection ramp 120 is off-centered or eccentric relative to this central part and located in the lower part 112. For example, the air injection ramp 120 is offset both on a transverse axis and on a vertical axis, relative to each of the treated effluent collection ramps 130, but is parallel and/or aligned on the same horizontal longitudinal axis.

In operation, in each tank portion 110*a* and 110*b*, the air injection ramp 120 creates an ascending air bubble stream FA from the bottom 112*a* of the tank 110, which causes an ascending stream of the effluents in each of the tank portions 110*a*, 110*b*. Due to the treated effluent collection ramp 130 located in the central part of the tank portion 110*a*, 110*b*, a spiral movement MS of the liquid effluents is created, which allows an optimal movement of the packing elements and therefore an optimized treatment of the liquid effluents in a restricted width and particularly in a limited tank height. In addition, no mechanical stirring is necessary, which limits the cost of the treatment module according to the present invention as well as the energy consumption during its operation. In the embodiment of FIGS. 1 to 3, two spiral movements of the liquid effluents occur during operation, one in each tank portion 110*a*, 110*b*.

In addition, the effluent supply ramps 140 create in each tank portion 110*a*, 110*b* a descending stream CD of liquid effluents to be treated along the walls of the tank 110 which allows strengthening this spiral movement MS of the effluents and therefore the mixing of the packing elements. The efficiency of the treatment of the effluents in the treatment module according to the present invention is therefore enhanced and the air injection flow rate can be limited, thus limiting energy consumption.

Thus, the tank 110 of the present treatment module 100 can be seen as comprising two tank portions 110*a*, 110*b* each adapted to allow a spiral movement of the packing elements and of the liquid effluents and comprising, to this end, two treated effluent collection ramps 130 each arranged in a central part of the spiral movement of the liquid effluents as well as the air injection ramp 120 arranged in an external or eccentric part of the spiral movement (s), for example in the lower part 112 of the tank portion 110*a*, 110*b*, i.e. below the treated effluent collection ramp 130.

The specific positioning of the treated effluent collection ramp 130 of each tank portion 110*a*, 110*b* relative to the air injection ramp 120 thus allows creating a spiral movement of the effluents contained in the tank in order to obtain an optimal treatment of the effluents in a tank of reduced width and especially of minimum height. A liquid effluent treatment module comprising such a tank can therefore be easily transported in an assembled form to be easily installed permanently or temporarily far from its place of manufacture.

The effluent supply ramp 140 of each tank portion 110*a*, 110*b* is preferably located in an eccentric or external part relative to the spiral movement of the effluents, for example in the upper part 111 of the tank 110, which can contribute to the creation and maintenance of the spiral movement of the effluents in a tank of minimum height without a large air flow rate and therefore with a limited energy consumption.

In the embodiment of FIGS. 1 to 3, the air injection ramp 120 is unique and comprises a longitudinal central segment as well as shorter transverse segments. However, the air injection ramp can take an alternative shape as explained below.

Thus, in the embodiment of FIG. 4, a liquid effluent treatment module 200 is identical to the liquid effluent treatment module 100 according to FIGS. 1 to 3, except for the air injection ramp 220. This indeed comprises three longitudinal segments 220*a*, 220*b*, 220*c* each provided with perforated air injection discs 221. These perforated air injection discs 221 allow a distribution of the air bubbles in a large volume and may therefore be preferable for some tank volumes, some types of tanks or some types of liquid effluents to be treated.

It will be understood that various modifications and/or improvements obvious to those skilled in the art can be made to the different embodiments of the invention described in the present description without departing from the scope of the invention defined by the appended claims. Particularly, reference is made to the air injection ramp 120 which can take any suitable shape, other than the shapes represented in the present figures. In addition, the air injection ramp 120 may extend over part or the entire length of the tank 110 and at a distance from or in the vicinity of a wall of the tank or the tank portion.

Likewise, the treated effluent collection ramps 130 can extend over part or the entire length of the tank 110 and can have a terminal portion open in their end oriented in the tank or the tank portion, as in the present figures, or preferably closed. For example, the terminal portion is closed by a T-tube for collecting the treated effluents from one or more other adjacent similar modules.

In the case where several liquid effluent treatment modules according to the present invention are connected in series, the terminal portion can be closed by a T-tube, a first horizontal branch of the T can therefore be connected to the collection ramp collecting the effluents from the treatment module. A second horizontal branch of the T can be connected through the vertical wall of the tank portion to the collection ramp collecting the effluents from another adjacent treatment module. Finally, the vertical branch of the T can be open and oriented for example upwards or downwards of the tank portion of the treatment module. Thus, thanks to a T-shaped sleeve, the treated effluents collected from another adjacent treatment module can be reinjected at least partially into the tank portion of the treatment module, which allows improving the treatment of the effluents and therefore the quality of the effluents collected after treatment.

The effluent supply ramps 140 preferably have an open end and can also extend over part or the entire length of the tank 110. In addition, they can be arranged in the vicinity of or at a distance from a wall of the tank 110 or the tank portion. They can also be arranged below the level of the liquid effluents, in particular if they are coupled to pumping means that allow overcoming the pressure of the liquid effluents. They preferably include ports oriented downwards, i.e. towards the lower part of the tank portion.

Finally, the tank 110 is not limited to a U-shaped section, but may have another shape or another section, for example a lower part of beveled shape or a flat bottom and/or a rounded or curved upper part. The tank 110 may be provided with a top cover, not represented, which can be sealed, so as to improve the efficiency of the biological effluent treatment reaction. This cover may be optionally provided with a gas collection device, so as to limit the odors generated by the treatment module during its operation and/or to upgrade the gases formed.

The invention claimed is:

1. A liquid effluent treatment module comprising at least one tank portion adapted to accommodate a plurality of packing elements in suspension capable of accommodating a biological material, the at least one tank portion defining a horizontal longitudinal axis and comprising at least one effluent supply,
the at least one tank portion further comprising:
    at least one treated effluent collection ramp arranged in a central part of the at least one tank portion and parallel to the horizontal longitudinal axis,
    at least one air injection ramp arranged in a lower part of the at least one tank portion, eccentrically and parallel to the at least one treated effluent collection ramp, so as to cause a spiral movement of liquid effluents,
wherein the at least one effluent supply comprises at least one effluent supply ramp parallel and eccentric relative to the at least one treated effluent collection ramp, and wherein the at least one treated effluent collection ramp is arranged halfway between the at least one air injection ramp and the at least one effluent supply ramp.

2. The treatment module according to claim 1, wherein the at least one effluent supply ramp is arranged in an upper part of the at least one tank portion.

3. The treatment module according to claim 2, wherein the at least one effluent supply ramp is arranged in an eccentric manner relative to the at least one air injection ramp.

4. The treatment module according to claim 1, wherein the at least one air injection ramp, the at least one effluent collection ramp and the at least one effluent supply ramp are located from bottom to top on a diagonal plane of the at least one tank portion.

5. The treatment module according to claim 1, wherein the lower part of the at least one tank portion comprises a curved or beveled section.

6. The treatment module according to claim 5, wherein the lower part comprises a generatrix parallel to the horizontal longitudinal axis of the at least one tank portion.

7. The treatment module according to claim 1, wherein the at least one tank portion comprises a bottom and in that the at least one air injection ramp is arranged on the bottom.

8. The treatment module according to claim 1, wherein the at least one tank portion comprises a plurality of packing elements and the liquid effluents, wherein the at least one air injection ramp and the at least one treated effluent collection ramp are arranged in a manner that induces the spiral movement of the liquid effluents.

9. The treatment module according to claim 1, wherein the at least one tank portion is formed by two tank portions separated by a vertical plane of symmetry and comprises the at least one air injection ramp disposed in the vertical plane of symmetry.

10. The treatment module according to claim 1, wherein the at least one tank portion comprises a sealed top cover and a gas collection device.

11. The treatment module according to claim 1, wherein the at least one tank portion has a height of less than 3.05 m.

12. A liquid effluent treatment system comprising at least one treatment module according to claim 1 and further comprising:
    a motorized effluent supply connected to the at least one effluent supply ramp and air injection devices connected to the at least one air injection ramp.

13. A liquid effluent treatment method using a treatment module according to claim 1, said method comprising the steps consisting of:
    providing a plurality of packing elements accommodating a biological material in the at least one tank portion,
    supplying the at least one tank portion with liquid effluents to be treated by the at least one effluent supply,
    injecting air through the at least one air injection ramp so as to create a movement of the liquid effluents in the form of a spiral,
    collecting treated effluents by the at least one treated effluent collection ramp, arranged in the central part of the tank portion.

\* \* \* \* \*